Figure 1:
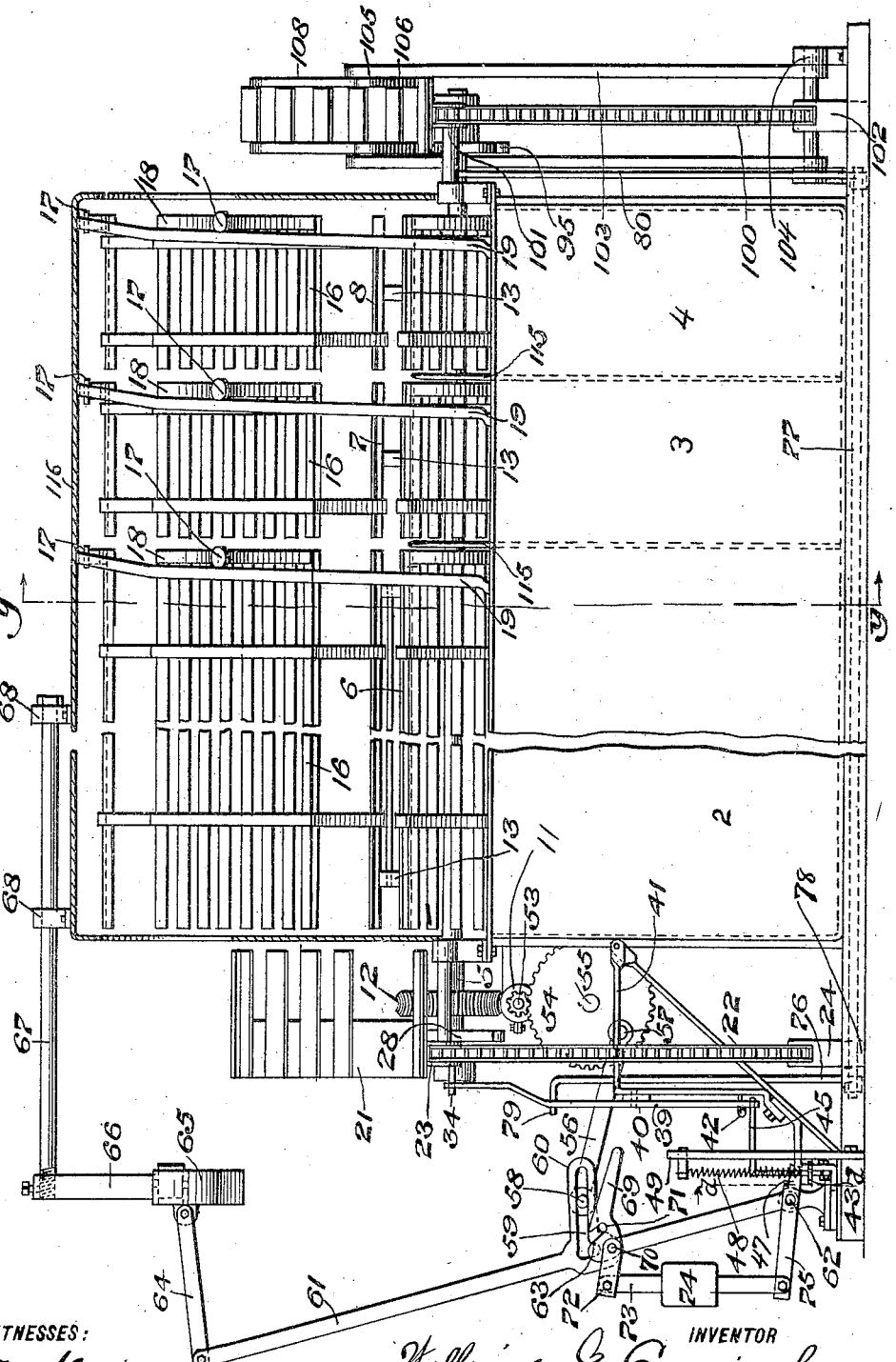

W. J. CUNNINGHAM.
BOTTLE WASHING MACHINE.
APPLICATION FILED SEPT. 23, 1907.

946,895.

Patented Jan. 18, 1910.
11 SHEETS—SHEET 5.

W. J. CUNNINGHAM.
BOTTLE WASHING MACHINE.
APPLICATION FILED SEPT. 23, 1907.

946,895.

Patented Jan. 18, 1910.
11 SHEETS—SHEET 7.

WITNESSES:
P. F. Nagle
H. G. Dieterich

INVENTOR
William J. Cunningham
Wiedersheim Fairbanks
ATTORNEY.

W. J. CUNNINGHAM.
BOTTLE WASHING MACHINE.
APPLICATION FILED SEPT. 23, 1907.

946,895.

Patented Jan. 18, 1910.

11 SHEETS—SHEET 8.

WITNESSES:
P. F. Nagle
H. G. Dieterich

INVENTOR
William J. Cunningham
BY
Wiedersheim Fairbanks
ATTORNEY.

W. J. CUNNINGHAM.
BOTTLE WASHING MACHINE.
APPLICATION FILED SEPT. 23, 1907.

946,895.

Patented Jan. 18, 1910.
11 SHEETS—SHEET 9.

WITNESSES:

INVENTOR
William J. Cunningham.
BY
ATTORNEY.

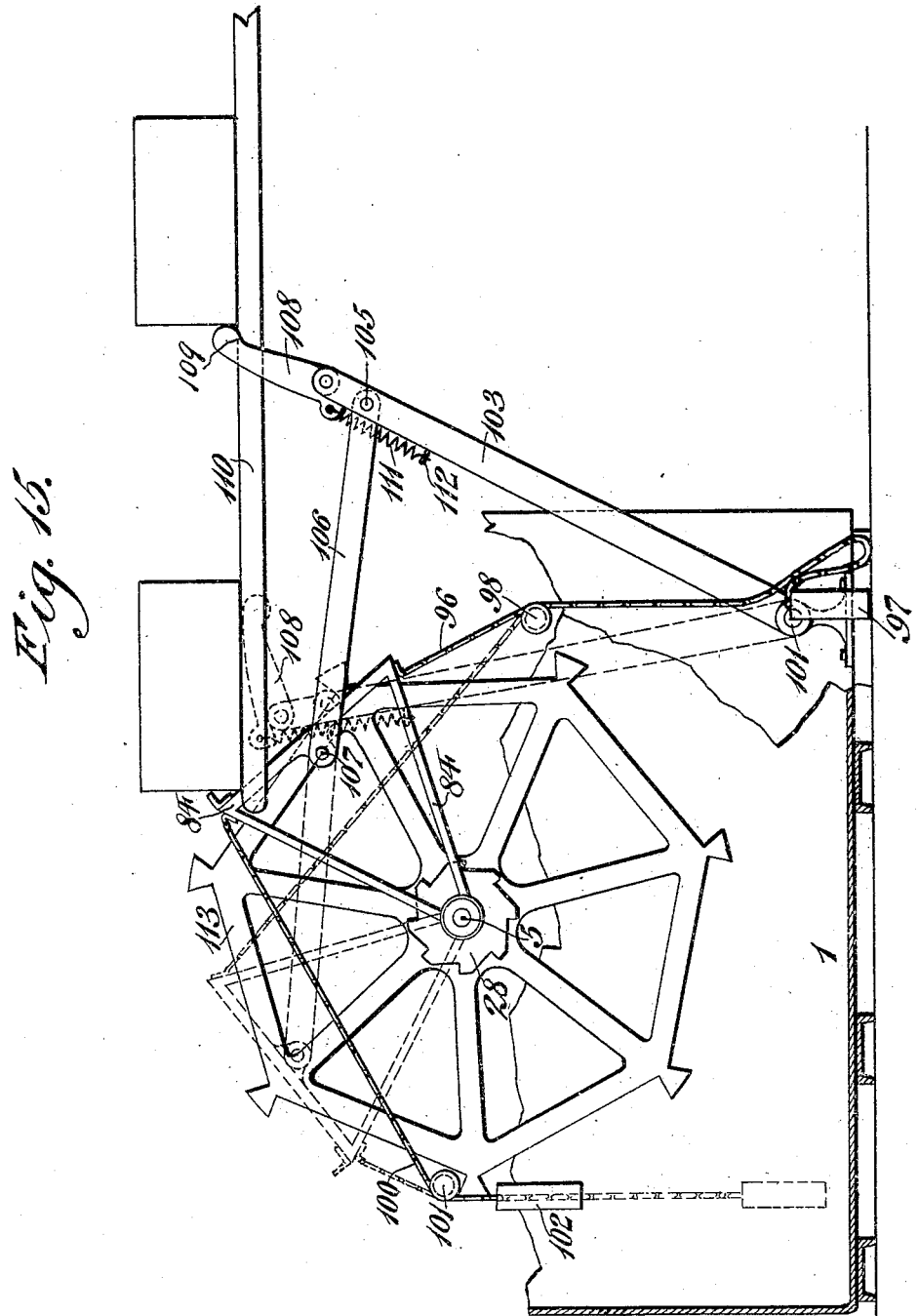

W. J. CUNNINGHAM.
BOTTLE WASHING MACHINE.
APPLICATION FILED SEPT. 23, 1907.
946,895.
Patented Jan. 18, 1910.
11 SHEETS—SHEET 11.
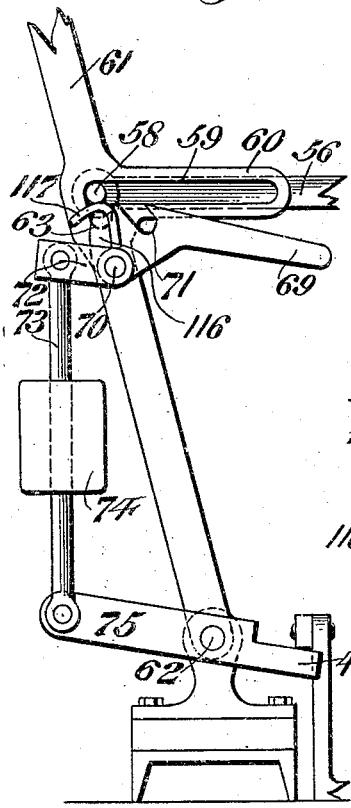
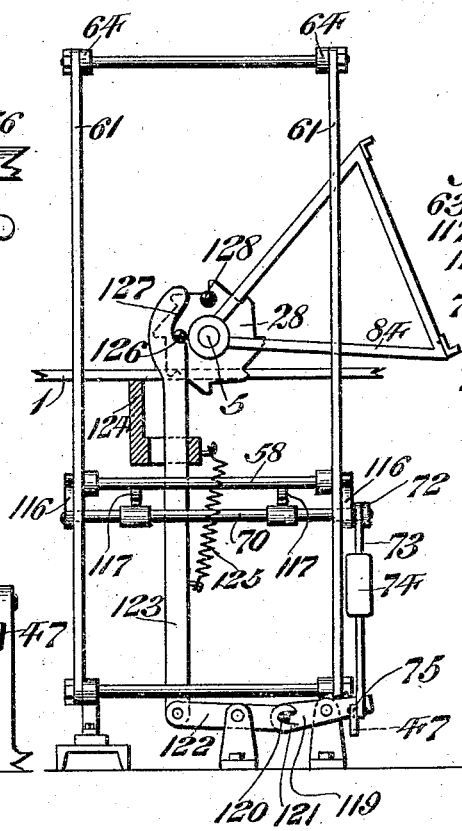
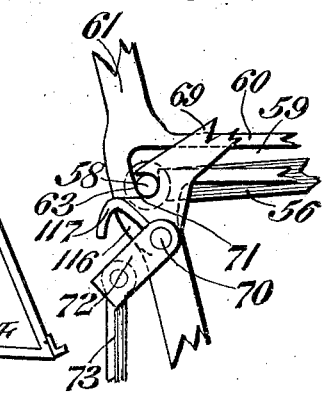

UNITED STATES PATENT OFFICE.

WILLIAM J. CUNNINGHAM, OF PHILADELPHIA, PENNSYLVANIA.

BOTTLE-WASHING MACHINE.

946,895.  Specification of Letters Patent.  Patented Jan. 18, 1910.

Application filed September 23, 1907. Serial No. 394,214.

*To all whom it may concern:*

Be it known that I, WILLIAM J. CUNNINGHAM, a citizen of the United States, residing in the city and county of Philadelphia, State of Pennsylvania, have invented a new and useful Bottle - Washing Machine, of which the following is a specification.

My present invention consists of a novel construction of bottle washing machine in which means are provided for passing cases of bottles into the machine and for discharging the cases of bottles therefrom after the same have been properly cleaned and rinsed.

It further consists of a novel construction of a receiving table and novel means for causing the same to rotate in unison with the rotatable carrier and in alinement with a case holder.

It further consists of a novel construction and arrangement of a rotatable carrier having a series of case holders adapted to receive a plurality of cases of bottles or similar articles and novel means for causing the receiving and discharging platforms to be simultaneously actuated.

It further consists of a novel construction for passing a case of bottles from the receiving platform to the rotatable carrier.

It further consists of a novel construction and arrangement of a plurality of independent tanks each of which is provided with a rotatable carrier having a series of case holders adapted to receive cases of bottles or similar articles and novel means for causing the different case holders to move longitudinally when the cases are being discharged from one carrier to another.

It further consists of novel means for rendering the charging mechanism operative or inoperative.

It further consists of other novel features of construction, all as will be hereinafter fully set forth.

For the purpose of illustrating my invention I have shown in the accompanying drawings one form thereof since this embodiment has been found to give satisfactory and reliable results in practice, although it is to be understood that the various instrumentalities of which my invention consists can be variously arranged and organized and that my invention is not limited to the exact arrangement and organization of these instrumentalities as herein set forth.

Figure 2:
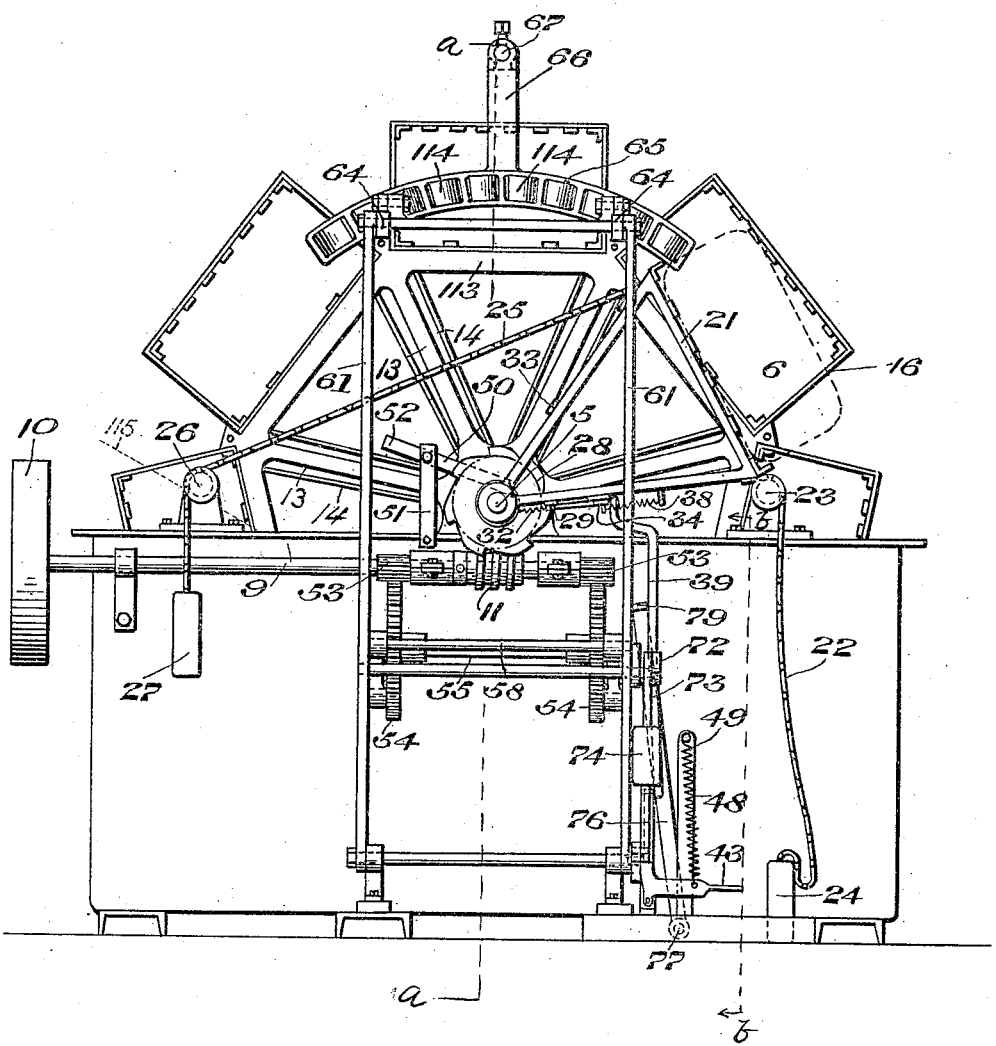
Figure 3:
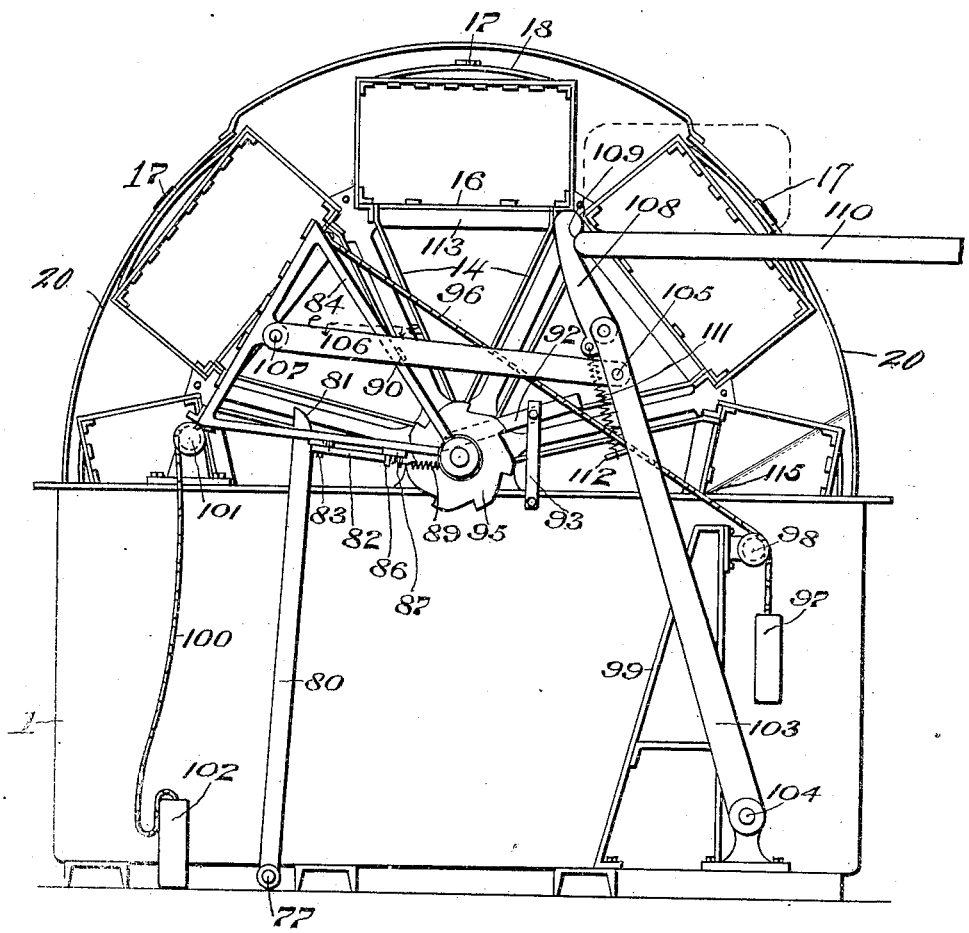
Figure 4:
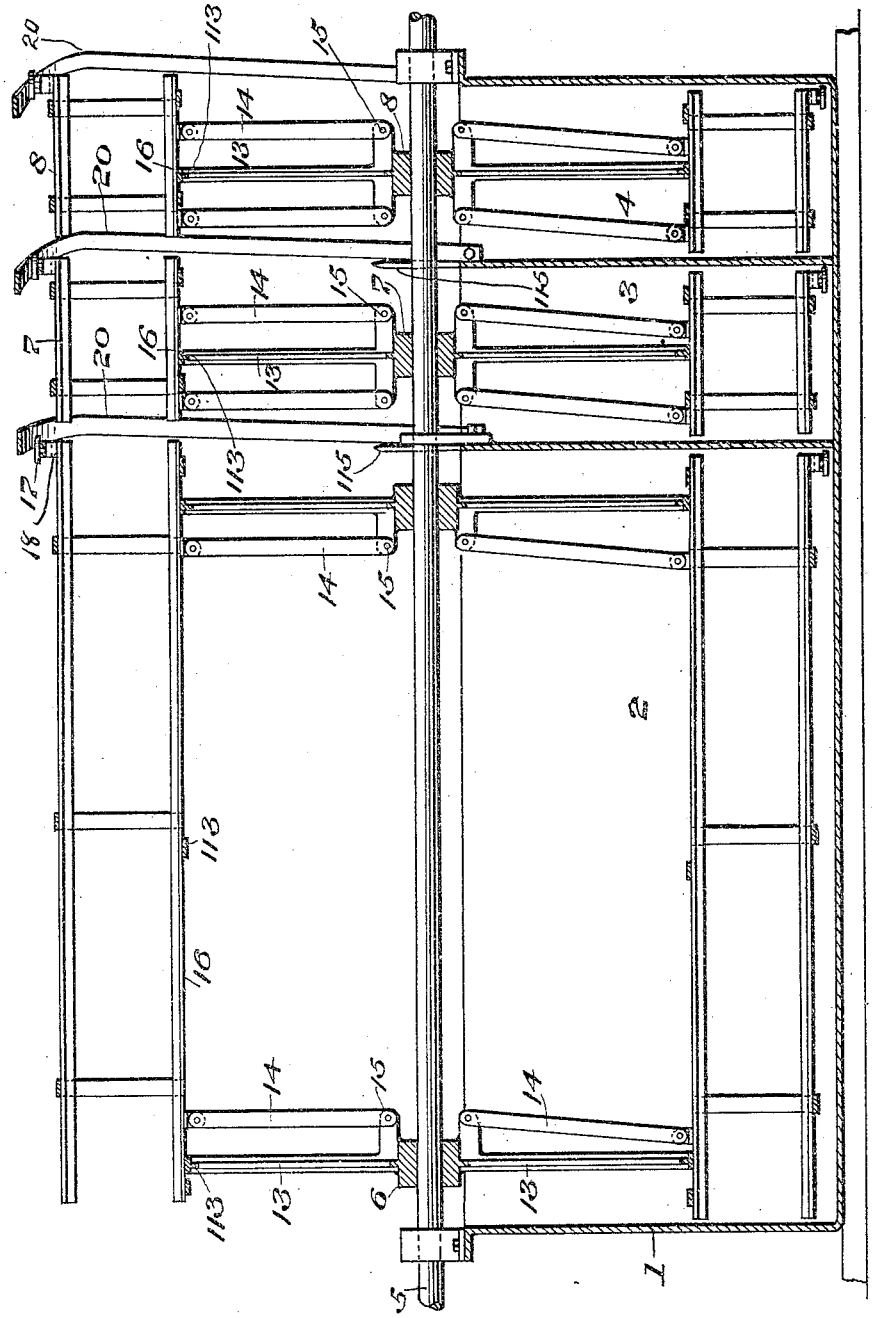
Figure 5:
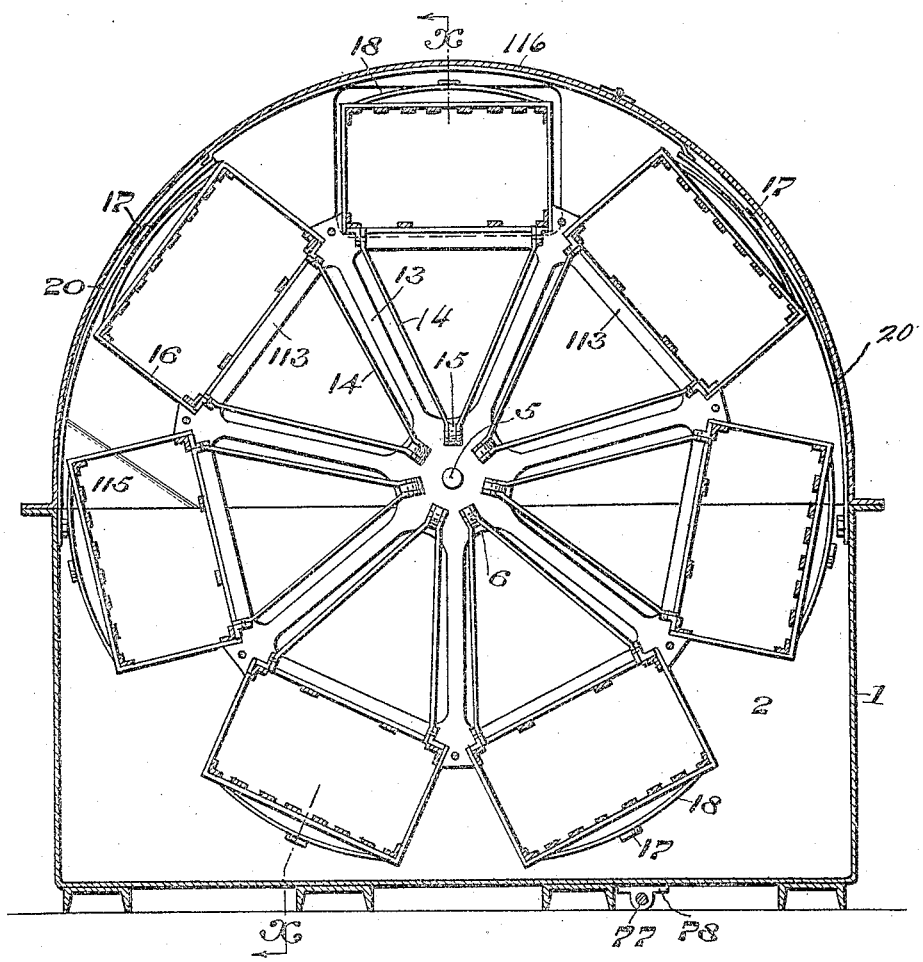
Figure 6:
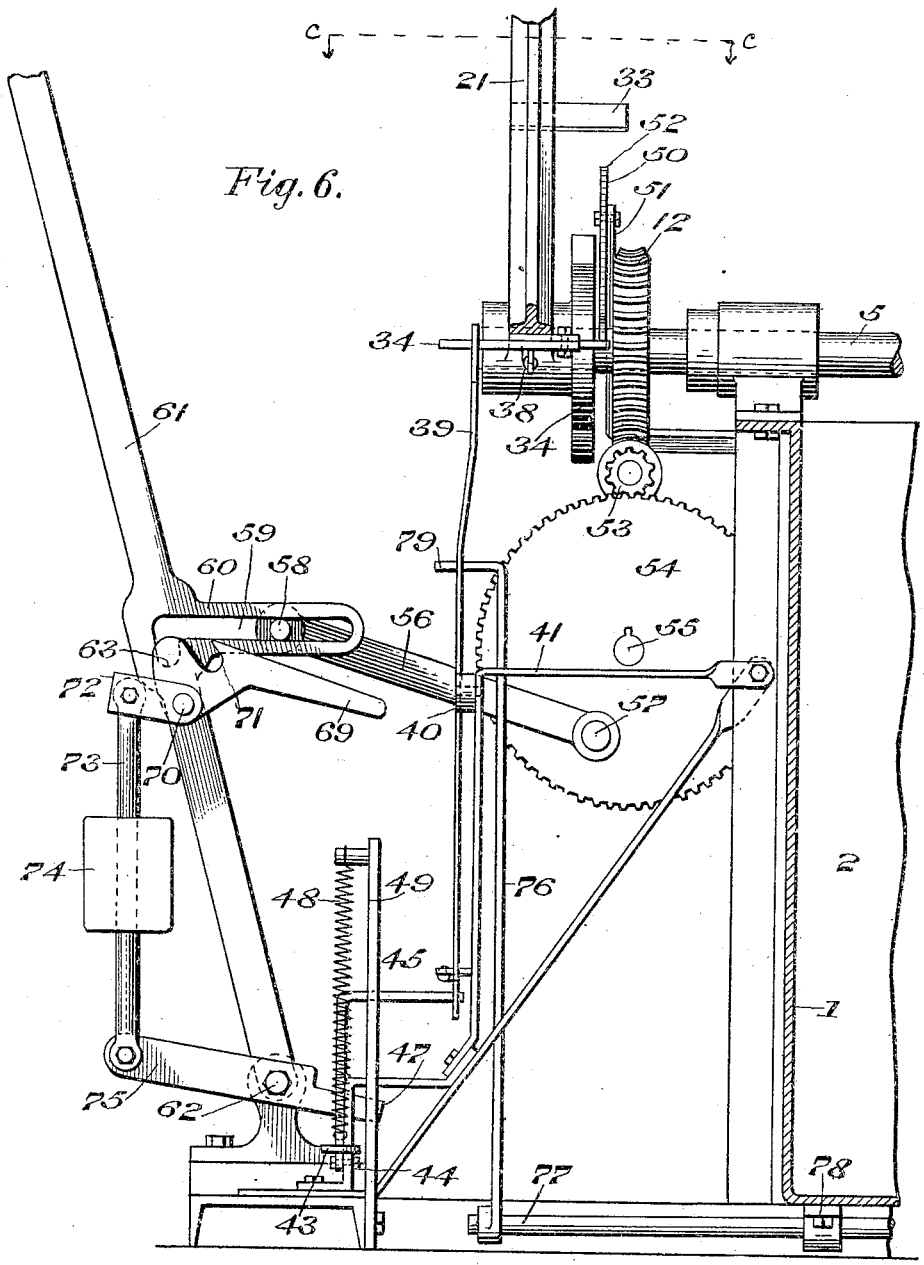
Figure 7:
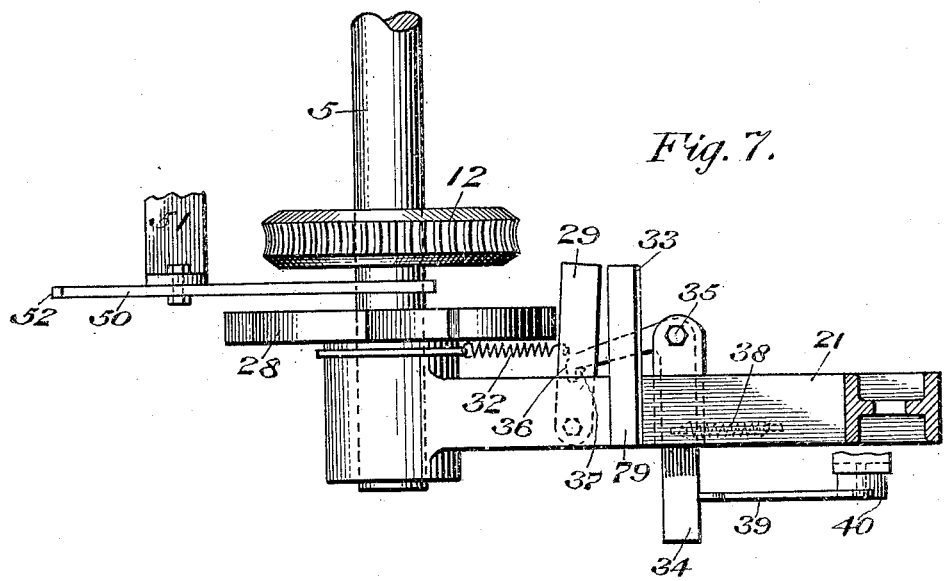
Figure 8:
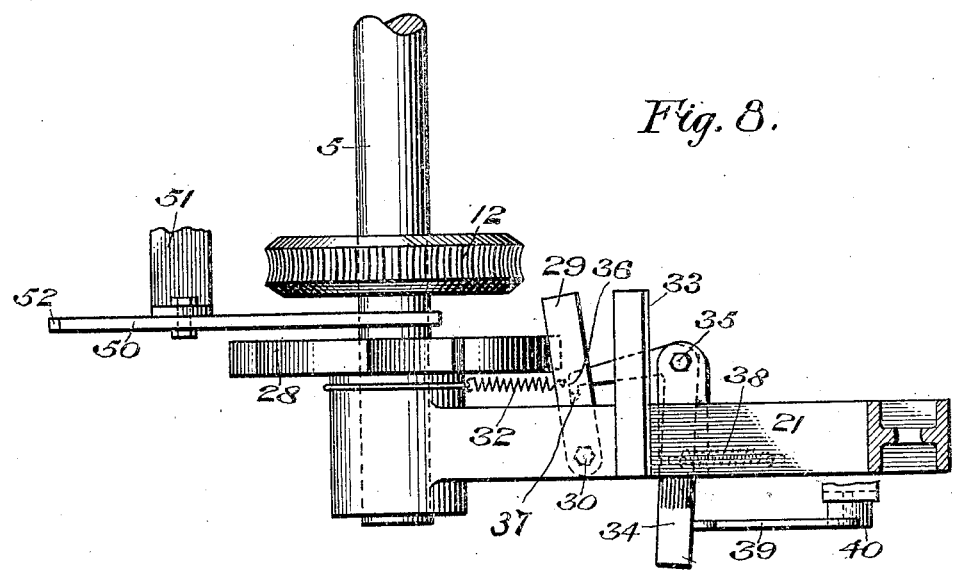
Figure 9:
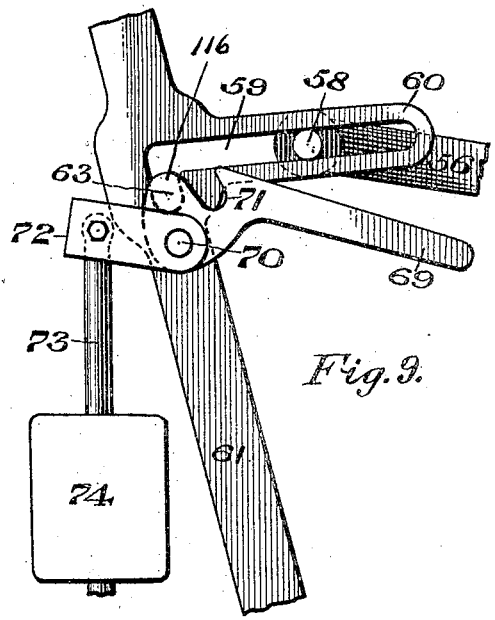
Figure 10:
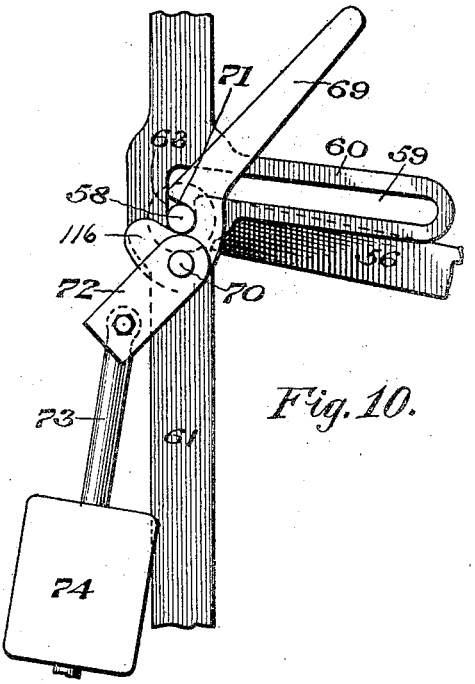
Figure 11:
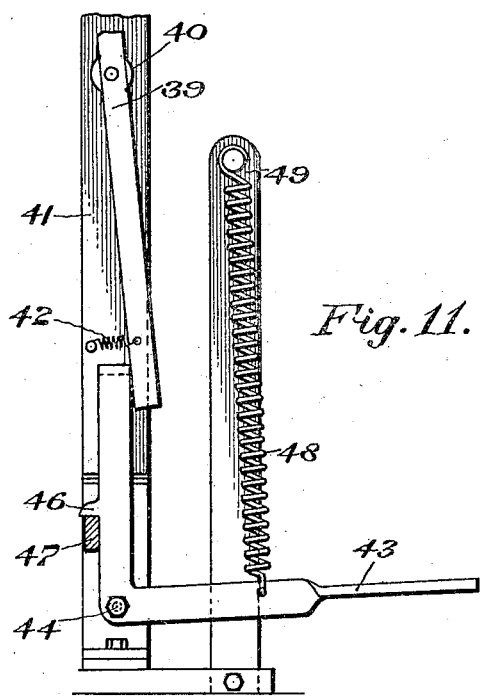
Figure 12:
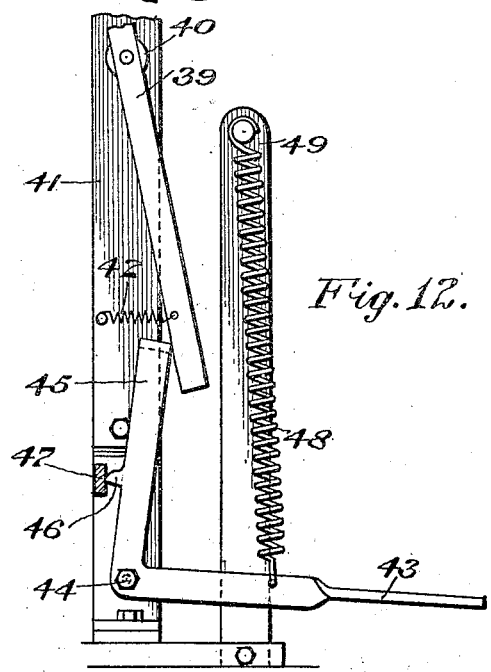
Figure 13:
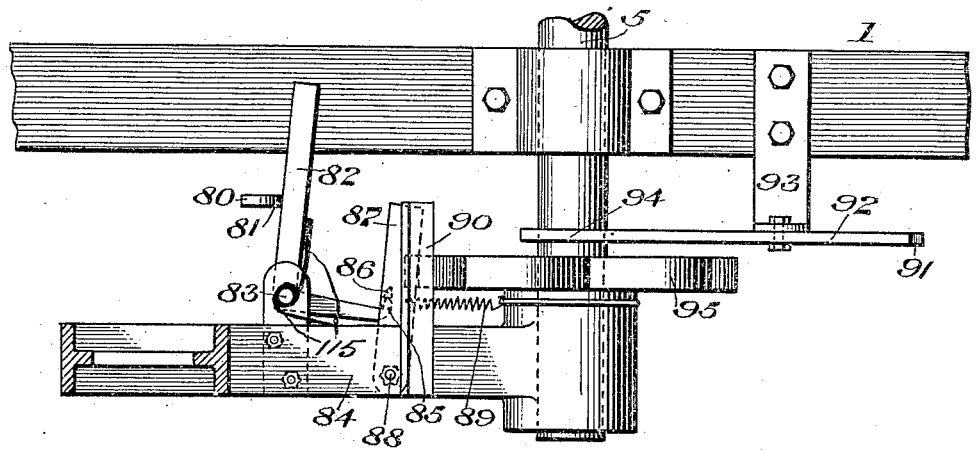
Figure 14:
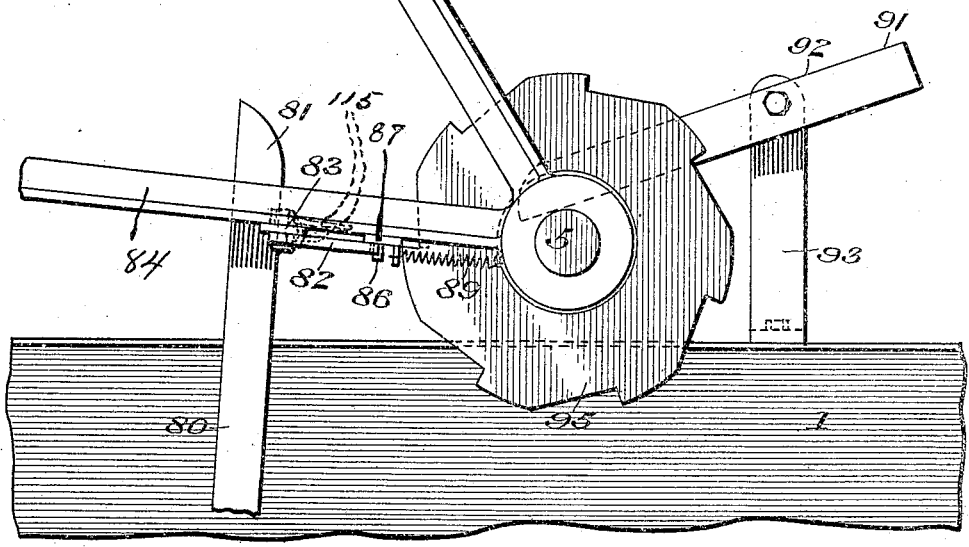

Figure 1 represents a side elevation partly in section, showing a bottle washing machine embodying my invention. Fig. 2 represents a front elevation thereof. Fig. 3 represents a rear elevation thereof. Fig. 4 represents a sectional view on line $a$—$a$, Fig. 2, certain parts thereof being broken away and showing more clearly the manner in which the rotatable case holders are automatically moved longitudinally at a predetermined time in their rotation. Fig. 5 represents a section on line $y$—$y$ Fig. 1, showing one of the rotatable carriers and the tank therefor. Fig. 6 represents a sectional elevation on line $b$—$b$, Fig. 2 of a portion of Fig. 1. Fig. 7 represents a sectional plan view on line $c$—$c$, Fig. 6 of a portion of the device showing more clearly the manner in which the receiving platform is caused to move in unison with the rotating case holders. Fig. 8 represents a sectional plan view on line $c$—$c$, Fig. 6 similar to Fig. 7, but showing the parts in different relation to each other. Fig. 9 represents a side elevation of a portion of the charging mechanism. Fig. 10 represents a side elevation of the parts seen in Fig. 9 but showing the same in a different relation to each other. Fig. 11 represents a sectional elevation on line $d$—$d$, Fig. 1 of a portion of the machine showing the actuating lever and certain of its adjuncts. Fig. 12 represents a sectional elevation on line $d$—$d$, Fig. 1 similar to Fig. 11 but showing the parts in different relation to each other. Fig. 13 represents a sectional plan view on line $e$—$e$, Fig. 3, certain parts being removed for clearness of illustration and showing the manner in which the receiving platform is interlocked with and released from the rotating shaft. Fig. 14 represents a side elevation of Fig. 13. Fig. 15 represents an end view of the machine, partly in section, certain of the parts being omitted in order to more clearly show the discharging mechanism. Fig. 16 represents a front elevation of a portion of the machine partly in section, showing especially one means for returning the discharging mechanism to normal position. Fig. 17 represents a side elevation of a portion of Fig. 16. Fig. 18 represents a side elevation of a portion of Fig. 17, certain of the parts being shown in a different relation to each other.

Similar numerals of reference indicate coresponding parts in the figures.

Referring to the drawings:—1 designates a casing of a bottle washing machine embodying my invention, the same being provided with a plurality of tanks and in the present instance I employ a tank 2 in which any desired caustic or other washing solution is adapted to be placed and also tanks 3 and 4 for the rinsing solution.

5 designates a driven shaft which is rotatively carried by the casing 1, said shaft having mounted thereon a plurality of rotatable carriers 6, 7 and 8, as is more clearly indicated in Fig. 4, said carriers being adapted to rotate in the tanks or compartments 2, 3 and 4 respectively.

9 designates a driving shaft on which is mounted a driving pulley 10, said shaft having also mounted thereon a worm 11 which meshes with a worm wheel 12, mounted on the shaft 5. The rotatable case carriers 6, 7 and 8 are provided with hubs rigidly secured to the shaft 5, said hubs having extending therefrom the radial arms 13 which are connected by the arms 113 on which the case carriers are longitudinally movable.

14 designates radial arms which are pivoted at their inner ends at 15 to the hub or other suitable portion of the radial arms 13, the other ends thereof being pivoted to the case holder 16 in such a manner that the longitudinal movement of the case holders is permitted at predetermined times. A plurality of these case holders is employed, as best seen in Fig. 5, there being in the present instance a series of seven case holders shown, although it is to be understood that the number of such case holders may be increased or diminished according to the requirements and conditions of the case. Each case holder 16 is provided near one end with a roller 17, which is carried by a band 18 secured to the frame forming a case holder. The rollers 17 are adapted to co-act with the bars or bands 19 and 20, which are secured to the casing 1 and are inclined toward one end of the machine and are secured to the casing cover in any suitable manner, so that the upper ends of the bars 19 and 20 are nearer one end of the machine than are the lower ends of said bars.

21 designates a platform or receiving support adapted to initially receive a case of bottles which are to be cleaned. The receiving support 21 has secured thereto, near one end, a sprocket chain 22 which passes around the sprocket wheel or roller 23 which is suitably carried by the casing 1 and as best seen in Fig. 2, the chain 22 is provided with a counterbalance 24. The opposite side of the receiving support 21 has fixed thereto one end of a sprocket chain 25, which passes around a roller 26, suitably carried by the casing 1, the other end of said chain 25 being provided with a counterbalance 27.

28 designates a ratchet wheel fixedly mounted on the shaft 5 in proximity to the receiving support 21. Since the carrier on which the case holders are located is continuously rotated, it is essential that when a case of bottles is being passed from the receiving support into a case holder, that for a desired interval of time the receiving support 21 is moved in unison with the rotating carrier and to this end I provide novel means for causing the carrier and the receiving support to move in unison and also means whereby said receiving support is automatically released in order that it may be returned to its initial position by means of the counterbalance 24.

29 designates a lever which is pivoted at 30 to one of the arms forming a portion of the receiving support 21, said lever normally tending to move in one direction, owing to the tension of a spring 32, one end of which is attached to a fixed portion of the receiving support 21, such as the hub thereof, the other end of said spring being secured to the lever 29.

33 designates an arm fixed to a portion of the receiving support 21 and, as seen in Fig. 2, this arm in the present instance is located on the opposite side of the receiving support from the lever 29.

34 designates a bell crank lever which is pivoted at 35 to a suitable portion of the support 21, said lever having one end thereof deflected to form a hook 36 which is adapted to engage at certain times with a pin 37 carried by the lever 29 in order to normally maintain the latter out of engagement with the ratchet wheel 28.

38 designates a spring, one end of which is secured to a suitable portion of the support 21, the other end thereof being secured to the lever 34.

39 designates a lever movably mounted on a standard 41, carried by the casing 1 in any suitable manner, said lever having secured at its lower end one end of a spring 42, the other end thereof being secured to the standard 41.

43 designates a treadle which is fulcrumed at 44 on the standard 41. The treadle 43 has secured thereto a lever 45 which is adapted to engage the lever 39 to actuate the same, as will be best understood by Figs. 11 and 12. The lever 45 is provided with a lug 46 which is adapted to co-act with the end 47 of a lever 75, which is fulcrumed at 62 to the framework of the machine and the purpose of which will hereinafter appear. The treadle 43 is normally maintained in the position indicated in Fig. 11 by means of a spring 48, one end of which is secured to said treadle, the other end thereof being secured to a standard 49.

Referring now more particularly to Figs. 7 and 8, 50 designates a lever which is fulcrumed to a standard 51 supported in any suitable manner, the end 52 of said lever being in the path of the arm 33 in order that the lever 50 will be turned on its fulcrum so that the other end thereof contacts with the lever 29, thereby causing said lever 29 to be disengaged from the ratchet 28 and thereby permit the receiving support 21 to be returned to its normal position by its counterbalance 24.

*The charging mechanism.*—I will next describe the mechanism employed for passing the cases of bottles into the machine from the receiving support 21. The shaft 9, as most clearly indicated in Fig. 2, is provided with gears 53 which mesh with gears 54, mounted on a shaft 55 suitably journaled in the frame of the machine.

56 designates links, which are eccentrically pivoted at 57 to the gear 54, said links being connected at their outer ends by means of a rod 58 which travels in slots 59 of the lugs or projecting portions 60, extending from the lever 61. The levers 61 are fulcrumed at 62 to suitably fixed points. The slots 59 have angularly extending therefrom slots or recesses 63 in which the rod 58 is adapted to be automatically seated, after the treadle 43 has been actuated, as hereinafter explained. The levers 61 have pivoted thereto, at their upper ends, the links 64, the latter being pivoted to a plunger 65, which is carried by an arm 66 adjustably mounted on a rod 67, which latter is movably carried by suitable brackets 68 supported by the casing or cover of the device. In the present instance the plunger 65 is shown as comprising a segment having mounted therein a plurality of rollers 114 in order to reduce to a minimum the friction between the plunger 65 and a case of bottles.

In order that the rod 58 may be moved into engagement at the proper time with the slot 63, I employ levers 69 fulcrumed at 70 to the lever 61 and provided with a cam slot 71 which is adapted to coöperate with the rod 58 to cause the latter to be positively seated in the slot 63. The levers 69 are provided with a cam shaped lug 116 which is adapted to co-act with the rod 58 to move it out of engagement with the slots 63 and in order to accurately control the co-action of the rod 58 with the slot 63 I preferably employ cam members 117, which are fixedly mounted on the rod 70.

72 designates an arm fixedly mounted on the rod 70 and also pivotally connected with a rod 73 on which is mounted a weight or counterbalance 74, the lower end of the rod 73 being operatively connected with the lever 75 fulcrumed at 62 and the end 47 of the lever 75 is adapted to be engaged by a lug 46 on the lever 45, as will be readily understood by reference to Figs. 11, 12 and 16.

76 designates a lever which, as most clearly seen in Fig. 1, is fixed to a shaft 77 journaled in bearings 78 carried by the casing 1, the upper end of said member 76 being deflected, as at 79, whereby the same is in the path of the lever 39. The shaft 77 extends the length of the machine and has fixed to its opposite end a lever 80, the upper end of which is provided with a cam face 81, as most clearly seen in Fig. 13.

*The discharging mechanism.*—The cam face 81 is adapted to engage a bell crank lever 82 which is fulcrumed at 83 to the discharging support 84, the latter being adapted to receive a case of bottles after the same has been discharged from one of the case holders on the carrier 8. The end of the bell crank lever 82 is provided with a hook 85 which is adapted to engage a stud 86 carried by a lever 87, which latter is pivoted at 88 to the discharge support 84. The bell crank lever 82 is provided with a suitable spring 118 whereby the lever 82 is normally maintained in the position indicated in Fig. 13.

89 designates a spring, one end of which is secured to the lever 87, the other end thereof being secured to the support 84 in such a manner that the stud 86 is normally maintained in engagement with the hook 85.

90 designates an arm fixed to the support 84, said arm being adapted to engage the end 91 of a lever 92, which latter is fulcrumed to a bracket 93 carried by the casing 1 so that the end 94 of the lever 92 will engage at a certain time with the lever 87 and cause the latter to be disengaged from the ratchet wheel 95, which is fixedly mounted on the shaft 5. The support 84 on which the cases are discharged, is preferably counterbalanced in a manner similar to that already described with reference to the receiving support 21.

96 designates a sprocket chain, one end of which is secured to the support 84, the other end thereof being provided with a counterbalance 97, and a roller 98 carried by a standard 99 is employed with which the chain 96 co-acts.

100 designates a sprocket chain passing over a sprocket wheel 101, one end of said chain being secured to the support 84 while the other end thereof is provided with a counterbalance 102.

103 designates levers pivoted at 104 to the frame of the machine, said levers having pivoted thereto at 105, links 106 which are pivoted at 107 on opposite sides of the support 84. The levers 103 have pivoted thereto the discharge arms 108 provided with contact portions 109, which engage the side of a case of bottles to move each case to the table or carrier 110, as will be understood by reference to Figs. 3 and 15.

111 designates springs, one end of which is secured to the arms 108, the other ends thereof being secured to a pin 112 carried by each lever 103. The bars 108 are provided with lugs which co-act with the levers 103 to prevent their rearward movement, it being understood that when the discharge support moves from the position seen in Fig. 15 to the position seen in Fig. 3, the arms 108 may pass under a case of bottles which is supported on the platform or carrier 110. The casing 1 is preferably provided with wedge shaped blocks 115 so that the bottle cases will be accurately guided into their respective tanks.

*The releasing mechanism for the receiving support.*—119 designates a lever suitably fulcrumed, one end of which is adapted to extend over one end of the lever 75. The other end of the lever 119 is provided with a pin 120 which co-acts with a slot 121 in a lever 122, suitably fulcrumed, and having its other end pivotally connected with a lever 123, which is guided in a bracket 124.

125 designates a spring, one end of which is secured to the lever 123, the other end thereof being secured to the bracket 124, whereby the upper end of the lever is maintained normally in engagement with a pin 126 carried by the ratchet wheel 28. The upper end of the lever 123 is provided with a cam face 127, which co-acts with a pin 128, as will more fully hereinafter appear.

The operation of my novel construction of bottle washing machine is as follows:—The receiver support 21 and the discharge support 84 are actuated in such a manner that for a desired interval they rotate in unison with the rotatable carriers 6, 7 and 8 and in alinement with a set of case holders thereon and owing to the novel manner in which they are released and the counterbalances provided therefor, they are automatically returned to their initial position. A driving pulley 10 is operatively connected with any desired source of power and as said pulley rotates the driving shaft 9 is rotated in unison therewith and owing to the provision of the worm 11 which meshes with the worm wheel 12, the shaft 5 on which said worm wheel is mounted is continuously rotated during the operation of the machine. The carriers and the case holders supported thereon are continuously rotated in the same direction. I also provide manually controlled means for passing the cases of bottles from the receiving support 21 into the rotating carriers and simultaneously therewith, causing a case holder to be discharged from one carrier into the next in series and from the last carrier to the discharging support 84.

It is to be understood that as the carriers are continuously rotated a case of bottles which is to be cleaned is placed on the receiving support 21, which is normally in the position indicated in Fig. 1. The operator next depresses the treadle 43 against the tension of the spring 48 thereby causing the lever 39 to be rocked on its fulcrum 40 so that the upper end of said lever will engage the lever 34 thereby causing said lever 34 to be moved from the position seen in Fig. 7 into the position seen in Fig. 8. This causes the hook 36 to be disengaged from the pin 37 carried by the lever 29 so that the tension of the spring 32 will cause the lever 29 to be moved into engagement with the ratchet 28 fixed on the shaft 5 and since the shaft 5 is continuously rotating, the receiving support 21 will rotate in unison therewith. As soon as the receiving support is rotated into preferably its highest position, the case holder thereon will be moved into the case holder in alinement therewith on the left hand carrier by the charging mechanism, the operation of which will now be described. When the operator depresses the treadle 43 in order to interlock the receiving support with respect to the rotating carriers the lug 46, seen in Figs. 11 and 12, will be withdrawn, thereby permitting the counterbalance 74 to rock the lever 75 on its fulcrum, thereby drawing down the rod 73 and causing the arm 72 to rock the shaft 70 on which the levers 69 are mounted. As will be understood by reference to Figs. 1 and 6, the links 56 secured to the gears 54 which are pivotally connected with the gear 12 fixed on the shaft 5, will cause the rod 58 to be continuously reciprocated within the slots 59 of the levers 61. As the levers 69 turn on their fulcrum 70, the cam lug 116, which normally prevents the rod 58 from entering the recesses 63, will be moved downwardly and the rod 58 will be engaged by the slot 71 and drawn into the slot 63 so that the rod 58 will be seated in such slot 63, thereby interlocking the same with the levers 61. As the links 56 now move forwardly they will cause a forward movement of the levers 61, thereby causing the plunger 65 to move forwardly and engage the case of bottles, which at this time is in its highest position on the receiving support 21, and such case of bottles will be moved into the case holder supported on the carrier 6, which at this time is in alinement with the plunger 65. Assuming that each case holder in the carriers 6, 7 and 8 has cases of bottles therein, when a case of bottles is inserted in the case holder 6 the end case will be moved into the case holder in alinement therewith on the carrier 7 and a case holder in the carrier 7 will be moved therefrom into a case holder in alinement therewith on the carrier 8, while the case of bottles in a case holder on the carrier 8 will be discharged therefrom on to a discharging support 84, as will later be more fully described.

It will be understood that as the carriers rotate the rollers 17 co-acting with the bars 19, will cause the case holders, which are in alinement when in their highest position, to move toward the right so that as a case of bottles is passing from one carrier to another, such carriers will be in close proximity to each other. As the case holders continue to rotate, the rollers 17 co-act with the side of the bars 20 and cause them to move toward the left so that as they enter their respective tank they are passed therethrough in proper alinement. The wedge shaped members 115 serve to properly aline the case holders in the different carriers so that there is no liability of any of the cases of bottles striking the partition intermediate the tanks. The receiving support 21 is at this time interlocked with the ratchet 28 but as soon as the arm 33 strikes the end 57 of the lever 50 the opposite end of said lever 50 will be raised, thereby causing the pivoted lever 29 to be moved out of engagement with the ratchet 28 and maintained out of engagement until the hook 37 reengages with the pin 37 on the lever 29 in order to retain the same in the position indicated in Fig. 7, it being understood that the return movement of the receiving carrier or support 21 is effected by means of the sprocket chain 22 and its counterbalance 24.

Referring now more particularly to Figs. 16 and 17, it will be understood that in Fig. 16 the receiving support 21 is shown at its normal position. As the ratchet wheel 28 rotates the pin 126 will cause the lever 123 to be depressed against the tension of the spring 125 and this downward movement will continue until the pin 128 engages the cam face 127 and causes the pin 126 to be released from its engagement with the lever 123. As the lever 123 moves downwardly the lever 122 will rock on its fulcrum, thereby rocking the lever 119 and since the end of this lever passes over the lever 75, said lever will be rocked on its fulcrum and the rod 73 will be raised, thereby causing the lever 69 to be rocked from the position seen in Fig. 18 to its normal position so that the rod 58 will be moved out of its engagement with the slot 63, as will be understood by reference to Fig. 17. This can be accomplished by the cam lugs 116 on the member 69, although in practice I prefer to employ cam members 117, which are fixed on the shaft 70, as will be understood by reference to Fig. 16. As soon as the arms 69 assume their normal position the rod 58 cannot fall into the slots 63, since the cam lugs 116 and the cam members 117 will prevent such movement. It will thus be seen that as the receiving support 28 returns to its initial position the reciprocating of the plunger 65 will be stopped. The different cases of bottles have now all passed into the case holders in the manner just described, and assuming now that all the case holders are in their highest positions and a new case of bottles is being pushed into the machine by the charging mechanism, it will be apparent that the case in the right hand portion of the carrier 6 will be moved therefrom into the case holder in alinement therewith on the carrier 7 and a case holder on the carrier 7 will be moved therefrom into the case holder in alinement therewith on the carrier 8, while the case holder on the carrier 8 will be moved therefrom on to the discharging support, as will now be fully explained.

*The operation of the discharging mechanism.*—It will be understood from the foregoing description that when the treadle is operated, thereby actuating the lever 39, that the lever 76 will be simultaneously actuated therewith so as to rock the lever 80. As the lever 80 is rocked the upper end thereof will actuate the bell crank lever 82 so as to cause the hook 85 to release its engagement with the pin 86, thereby permitting the spring 89 to move the lever 87 into engagement with the ratchet 95, it being understood that the support 84 is locked into engagement with the ratchet 95 in this manner simultaneously with the locking of the receiving support 21 into engagement with the ratchet 28. When the discharging support 84 is in its highest position, it will be in alinement with the case holders through which the cases of bottles are passing, so that as a case of bottles is moved from the case holder on the carrier 8, it will be discharged on to the discharging support 84. As the discharging support 84 continues its forward movement, the arms 108 are moved forwardly so that if a case of bottles has already been deposited upon the platform or carrier 110, it will be moved forwardly into the position indicated in Fig. 15, while the case of bottles on the discharging support 84 will be moved into the position seen in Fig. 15, wherein one case of bottles has just been discharged upon the carrier 110. The bar 90 carried by the support 84 will, about this time, engage with the lever 91, thereby causing the end 94 to contact with the lever 87 to release the engagement of the latter with the ratchet 95 so that the counterbalance 102 may return the discharging support 84 to its normal position, as is indicated in Fig. 3. As the discharging support returns to its normal position, the arms 108, owing to the manner in which they are connected with the levers 103, may pass under the case of bottles on the platform 110, as is shown in dotted lines in Fig. 15. It will be apparent that owing to the provision of the levers 50, the levers 29 will be moved in such a manner that the pins 37 carried thereby will be engaged by the hooks 36 of the bell crank lever 34, while the pin 86 on the lever 87 will move into such a position that it will be engaged by the hook 85 of the bell crank lever 82, so that as the receiving and discharging supports return to their normal position there will be no liability of their becoming interlocked with their respective ratchets until the treadle has been operated.

So far as I am aware I am the first in the art to employ in a device of this character which is manually controlled, a plurality of rotatable members having case holders thereon adapted to pass into independent tanks, the case holders being adapted to automatically move toward each other at a desired time, and means for passing a case of bottles into one of the carriers and simultaneously therewith discharging a case from the end carrier in alinement therewith on to the discharging support and my claims to these features are to be interpreted with corresponding scope.

Owing to the employment of the wedge shaped members 115 if a case which has been pushed through one of the case holders is not accurately centered therein, such case of bottles, through the rotation of the case holder, will engage with the wedge shaped members 115 and cause the same to be properly alined on their respective case holders, so that they will not contact with the partition, which forms the separate tanks and the cases of bottles will pass through the solution contained within the tanks in an efficient and reliable manner. If a hood or cover is employed it would be provided with apertures at each end through which the cases would pass from the receiving support at one end to the discharging support at the opposite end.

Owing to the novel manner in which the different carriers are moved toward each other, the cases of bottles may readily pass from one carrier to the next in series.

It will now be apparent to those skilled in the art that I have devised a novel and useful construction of a washing machine which embodies the features of advantage enumerated as desirable in the statement of invention and the above description and while I have in the present instance shown and described a preferred embodiment thereof which gives in practice satisfactory and reliable results, it is to be understood that the same is susceptible of modification in various particulars without departing from the spirit and scope of the invention or sacrificing any of its advantages.

Having thus described my invention what I claim as new and desire to secure by Letters Patent, is:—

1. In a washing machine a tank, a rotatable carrier, a plurality of case holding members thereon, means for continuously rotating said carrier, and manually controlled means for passing a case into one of said case holders during the rotation of said carrier.

2. In a washing machine a tank, a carrier, a plurality of case holders thereon, a receiving support pivoted in proximity to said carrier, means for causing said support to move in alinement with one of said case holders during an interval in the rotation of the latter, and manually controlled means for passing a case from said support into the case holder in alinement therewith.

3. In a washing machine, the combination with a rotatable carrier of a plurality of case holders thereon, a tank into which said case holders pass, a shaft on which said carrier is mounted, a receiving support pivoted on said shaft, driving means for said shaft, means for causing said support to move in unison with said carrier at predetermined times, manually controlled means for passing a case from said support to the case holder in alinement therewith, and means for automatically releasing said support and returning it to its normal position.

4. In a washing machine, the combination with a rotatable carrier, of a plurality of case holders on its periphery, a tank into which said case holders pass, a shaft on which said carrier is mounted, a receiving support pivoted on said shaft, driving means for said shaft, means for causing said support to move in unison with said carrier and in alinement with a case holder at predetermined times, manually controlled means for automatically passing a case from said support to the case holder in alinement therewith, and means for causing said support to return to its initial position.

5. In a washing machine, a tank having a plurality of compartments, a driving shaft, a plurality of carriers extending into said compartments, case holders carried by said carriers, a receiving support, and means for causing a case to pass from said support into one of said case holders during the rotation of the latter.

6. In a washing machine, the combination of a tank having a plurality of compartments, a driving shaft, a plurality of carriers mounted thereon, case holders carried by said carriers, case supports on opposite sides of the machine and in alinement with said carriers, means for causing said supports to be moved in alinement with a case holder during a desired interval, and means for actuating said shaft.

7. In a washing machine, the combination of a tank having a plurality of compartments, a driving shaft, a plurality of carriers mounted thereon, case holders carried by said carriers, case supports on opposite sides of the machine, means for causing said supports to be moved in alinement with a case holder during a desired interval, means for actuating said shaft, and manually controlled means for passing a case from one of said supports into the case holder adjacent thereto.

8. In a washing machine, a tank having a plurality of compartments, a driving shaft, a plurality of carriers extending into said compartments, case holders carried by said carriers, a receiving support, means for causing a case to pass from said support into one of said case holders during the rotation of the latter, and means for longitudinally moving said case holders during their rotation.

9. In a washing machine, a tank having a plurality of compartments, a driving shaft, a plurality of carriers extending into said compartments, case holders carried by said carriers, a receiving support, means for causing a case to pass from said support into one of said case holders during the rotation of the latter, means for causing the automatic longitudinal movement of said case holders at predetermined intervals, and a support movably mounted and adapted to receive a case from a case holder on the carrier at the opposite end from said receiving support.

10. In a washing machine, a tank having a plurality of compartments, a driving shaft journaled in proximity to said tank, a plurality of carriers fixed on said shaft, case holders carried by said carriers, means for causing the automatic longitudinal movement of said case holders, and driving means for said shaft.

11. In a washing machine, a tank having a plurality of compartments therein, a shaft journaled in proximity to said tank, carriers rigidly carried by said shaft and extending into the different tanks, case holders pivoted to said carriers, means for causing the case holders in alinement on said carriers to be moved longitudinally, and means for actuating said shaft.

12. In a washing machine, a tank having a plurality of compartments therein, a shaft journaled in proximity to said tank, carriers rigidly carried by said shaft and extending into the different tanks, case holders pivoted to said carriers, means for causing the case holders in alinement on said carriers to be moved longitudinally, means for actuating said shaft, case receiving supports in alinement on opposite sides of the machine, means for causing said supports to move in alinement with a case holder, and means for automatically passing a case from one of said supports to a case holder, and from the case holder farthest therefrom to the other of said supports.

13. In a washing machine, a tank, a shaft located in proximity thereto, a carrier rigidly mounted on said shaft, case holders pivoted to said carriers, means for actuating said shaft, and devices for causing the longitudinal movement of said case holders.

14. In a washing machine, a tank, a shaft journaled in proximity thereto, a plurality of carriers fixedly mounted on said shaft, case holders pivoted to said carriers, rollers carried by said case holders, means coacting with said rollers to cause longitudinal movement of said case holders, and driving means for said shaft.

15. In a washing machine, a tank having a plurality of independent compartments, a shaft journaled in proximity thereto, carriers fixedly mounted on said shaft and adapted to rotate in said compartments, case holders movably supported by said carriers, means for automatically causing the longitudinal movement of said carriers, and means for simultaneously passing a case from one of said case holders into another of said case holders.

16. In a washing machine, a tank having a plurality of independent compartments, a shaft journaled in proximity thereto, carriers rigidly mounted on said shaft, case holders in alinement movably supported on said carriers, and adapted to enter independent compartments, a case support movably mounted at each end of the machine, means for causing said supports to simultaneously move in alinement with a set of case holders, and means for automatically causing a case to pass from one support into the case holder adjacent thereto.

17. In a washing machine, the combination with a tank, of a carrier rotatably mounted therein, case holders supported by said carriers, a case support pivotally mounted in proximity to said carrier, means for causing said support to rotate in alinement with a case holder during a predetermined interval, a plunger adapted to force a case from said support into the case holder in alinement therewith, means for actuating said plunger, and means for continuously rotating said carriers.

18. In a washing machine, the combination with a tank, of a carrier rotatably mounted therein, case holders supported by said carriers, a case support pivotally mounted in proximity to said carrier, means for causing said support to rotate in alinement with a case holder during a predetermined interval, a plunger adapted to force a case from said support into the case holder in alinement therewith, means for actuating said plunger, means for continuously rotating said carriers, and antifriction means for said plunger.

19. In a washing machine, a driving shaft, gears driven thereby, crank arms eccentrically connected with said gears, a rod carried by said crank arms, levers in which said rod reciprocates, a plunger actuated by said lever, means for interlocking said rod and lever, a driven shaft, a carrier mounted thereon, case holders carried by said carrier, a receiving support in proximity to said carrier, means for causing said carrier to move in unison with a case holder during a predetermined interval, and means for causing the automatic return of said support when released to its initial position.

20. In a washing machine, the combination with a tank, of a carrier mounted therein, case holders carried by said carrier, a receiving support in proximity to said carrier, means for causing said support to move in alinement with a case holder during a predetermined interval, devices for causing the automatic return of said support to its initial position, a plunger carried by said tank, and means for causing said plunger to force a case from said support into the case holder in alinement therewith during their rotation.

21. In a washing machine, a tank, a driven shaft, a sprocket wheel thereon, a case receiving support loosely mounted on said shaft, means for interlocking said support with said sprocket wheel, means for causing the automatic release of said support from said sprocket wheel, a carrier mounted on said driven shaft, a plurality of case holders carried by said carrier, a driving shaft, and means actuated by said driving shaft for passing a case from said support into a case holder during the rotation of the latter.

22. In a washing machine, a tank, a driven shaft, driving means therefor, a case receiving support movably mounted, means for causing said support to rotate in unison with said shaft during a predetermined interval, a plunger, levers operatively connected therewith and having angularly inclined slots therein, a rod mounted in one of said slots, crank arms secured to said rod, gears to which said crank arms are eccentrically secured, said gears being continuously rotated by said driving means, and means for causing said rod to engage the other of said slots and thereby actuate said plunger.

23. In a washing machine, a tank, a driven shaft, driving means therefor, a case receiving support movably mounted, means for causing said support to move in unison with said shaft during a predetermined interval, a plunger, rollers carried by said plunger, levers operatively connected therewith and having angularly inclined slots therein, a rod normally in one of said slots, crank arms secured to said rod, gears to which said crank arms are eccentrically secured, said gears being continuously rotated by said driving means, a second lever pivoted to said first lever and having a cam slot adapted to engage said rod, and a treadle to which said lever is operatively connected.

24. In a washing machine, a tank, a driven shaft, driving means therefor, a case receiving support movably mounted, means for causing said support to move in unison with said shaft at a desired time, a plunger, a lever operatively connected therewith and having angularly inclined slots therein, a rod mounted in one of said slots, crank arms secured to said rod, gears to which said crank arms are eccentrically secured, said gears being continuously rotated by said driving means, a second lever pivoted to said first lever and having a cam slot adapted to engage said rod, a treadle to which said lever is operatively connected, and a counterbalance for said second lever.

25. In a washing machine, a driving shaft, gears driven thereby, crank arms eccentrically secured to said gears, a rod carried by said crank arms, pivoted levers having angularly inclined communicating slots therein in one of which said rods freely reciprocates, a plunger connected with said lever and longitudinally movable, and means for causing said rods to be seated in the other of said slots to actuate said plunger.

26. In a washing machine, a driving shaft, gears driven thereby, crank arms eccentrically secured to said gears, a rod carried by said crank arms, pivoted levers having angularly inclined communicating slots therein, in one of which said rod freely reciprocates, a plunger connected with said lever and longitudinally movable, means for causing said rod to be seated in the other of said slots to actuate said plunger, and rollers carried by said plunger.

27. In a washing machine, a tank having intermediate compartments, a plurality of carriers rotatably mounted in said compartments, case holders carried by said carriers, means for automatically passing a case into a case holder on one carrier during its rotation, and means for automatically discharging a case from the case holder in alinement therewith and mounted on the carrier at the opposite end of the machine.

28. In a washing machine, a tank having a plurality of compartments, a plurality of carriers rotatably mounted in said compartments, case holders carried by said carriers, means for causing said carriers to move longitudinally at predetermined intervals, means for passing a case of bottles through the case holders on different carriers, a movable support to which the cases are discharged, and means actuated by said support for discharging a case of bottles therefrom.

29. In a washing machine, a tank having a plurality of compartments, a plurality of carriers rotatably mounted in said compartments, case holders carried by said carriers, means for causing longitudinal movement of said carriers at predetermined intervals, a case receiving support, means for causing said support to rotate for a desired time in alinement with a case holder, a platform in proximity to said support, and means carried by said support for automatically causing a case thereon to pass to said platform.

30. In a washing machine, a tank, a carrier rotatably mounted therein, case holders mounted on the periphery of said carrier, a movable support in proximity to said carrier, means for causing said support to move in alinement with the case holder for a desired time, levers pivoted to said support, a third lever to which said levers are pivoted, and means carried by said third lever adapted to advance a case of bottles after it leaves said support.

31. In a washing machine, a tank, a carrier rotatably mounted therein, case holders mounted on the periphery of said carrier, a movable support in proximity to said carrier, means for automatically moving said case holders toward and away from said support at predetermined intervals, means for causing said support to move in alinement with a case holder for a desired time, levers pivoted to said support, a third lever to which said levers are pivoted, and means carried by said third lever adapted to advance a case of bottles after it leaves said support.

32. In a washing machine, a tank having a plurality of compartments, a plurality of carriers rotatably mounted in said compartments, case holders carried by said carriers, a case receiving support, means for causing said support to rotate for a desired time in alinement with a case holder, means for passing cases through said case holders during their rotation, and means intermediate the separate carriers for alining the cases in their case holders.

33. In a washing machine, a driven shaft, driving means therefor, a plurality of separate tanks, case holders rotatably mounted in said tanks and extending into independent tanks, wedge-shaped members intermediate the different tanks for alining cases in said case holders, and means for passing cases into one of said case holders and from one case holder to the next in series.

34. In a washing machine, a tank having a plurality of compartments, a shaft suitably mounted with respect to said compartments, case holders carried by said shaft, on opposite sides thereof, the holders on each side being in alinement with each other but adapted to be inserted in different compartments, and means for rotating said shaft whereby one set or the other of said holders will be located in the compartments.

35. In a washing machine, a rotatable member, and means for passing the articles to be washed thereinto during its rotation.

WILLIAM J. CUNNINGHAM.

Witnesses:
H. S. FAIRBANKS,
C. D. McVAY.